Oct. 29, 1963 G. E. WOLFE, JR 3,108,400
PLANT WATERING SYSTEM
Filed Oct. 4, 1961 3 Sheets-Sheet 1
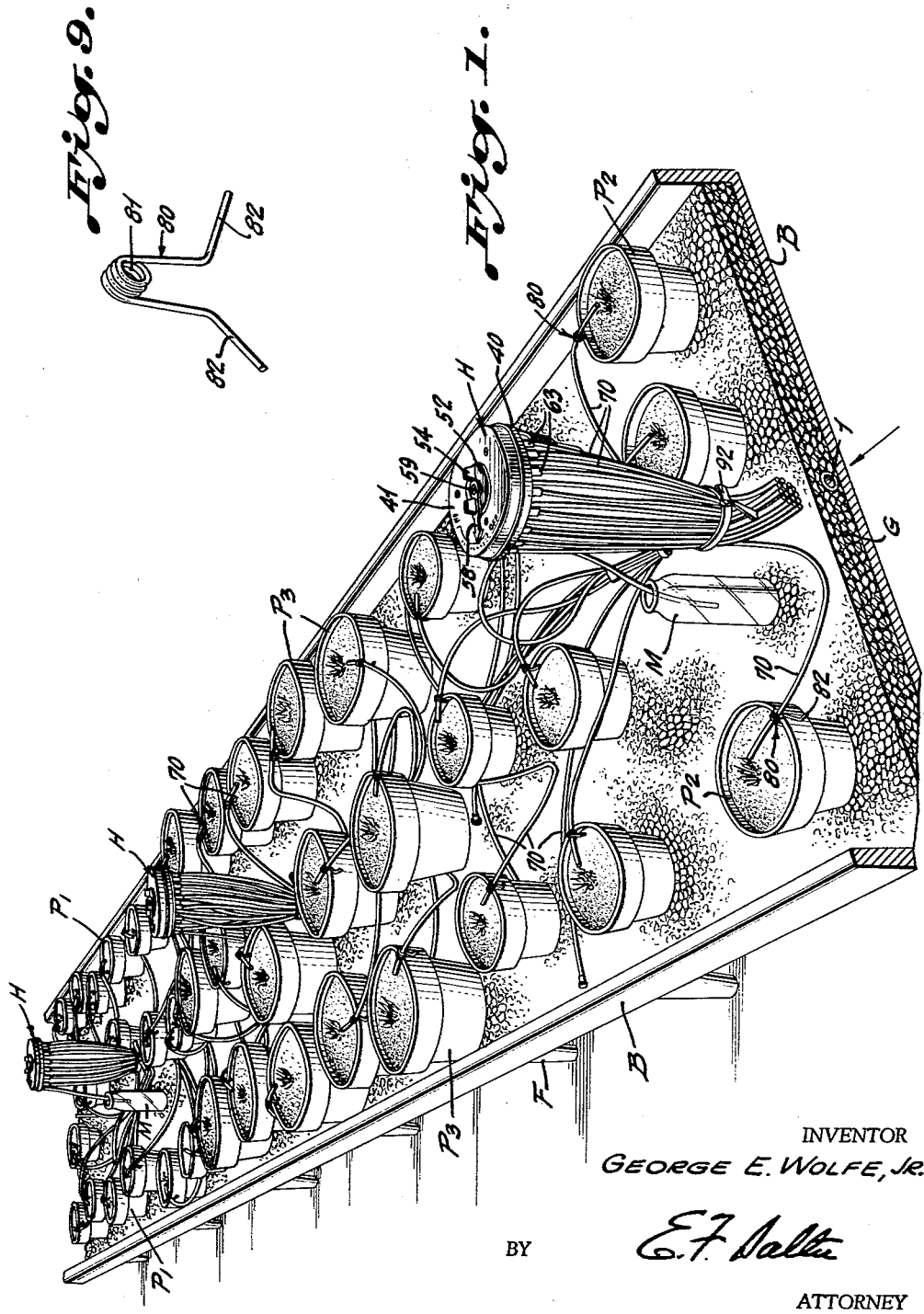
INVENTOR
GEORGE E. WOLFE, JR.
BY
ATTORNEY Oct. 29, 1963  G. E. WOLFE, JR  3,108,400
PLANT WATERING SYSTEM
Filed Oct. 4, 1961  3 Sheets-Sheet 2
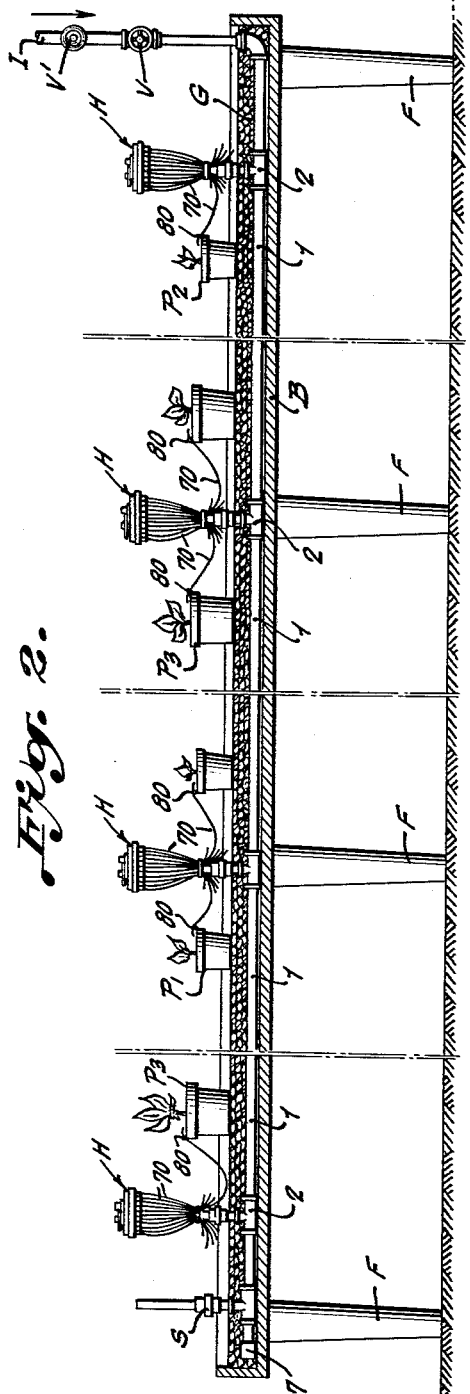
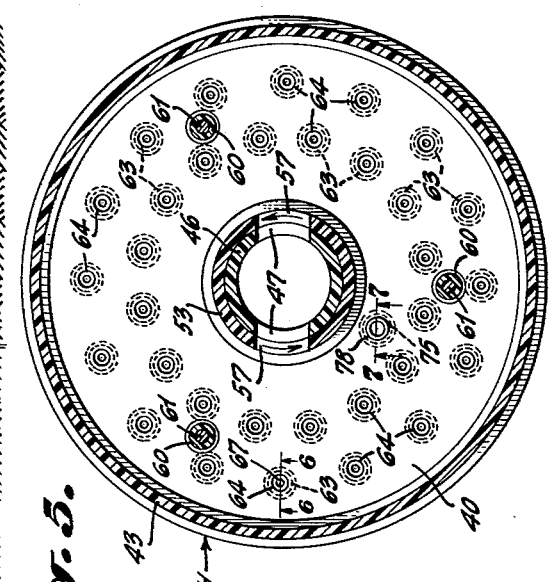
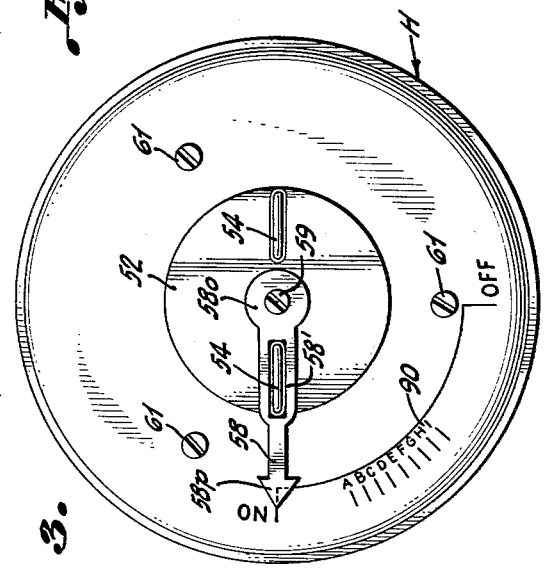
INVENTOR
GEORGE E. WOLFE, JR.
BY
ATTORNEY

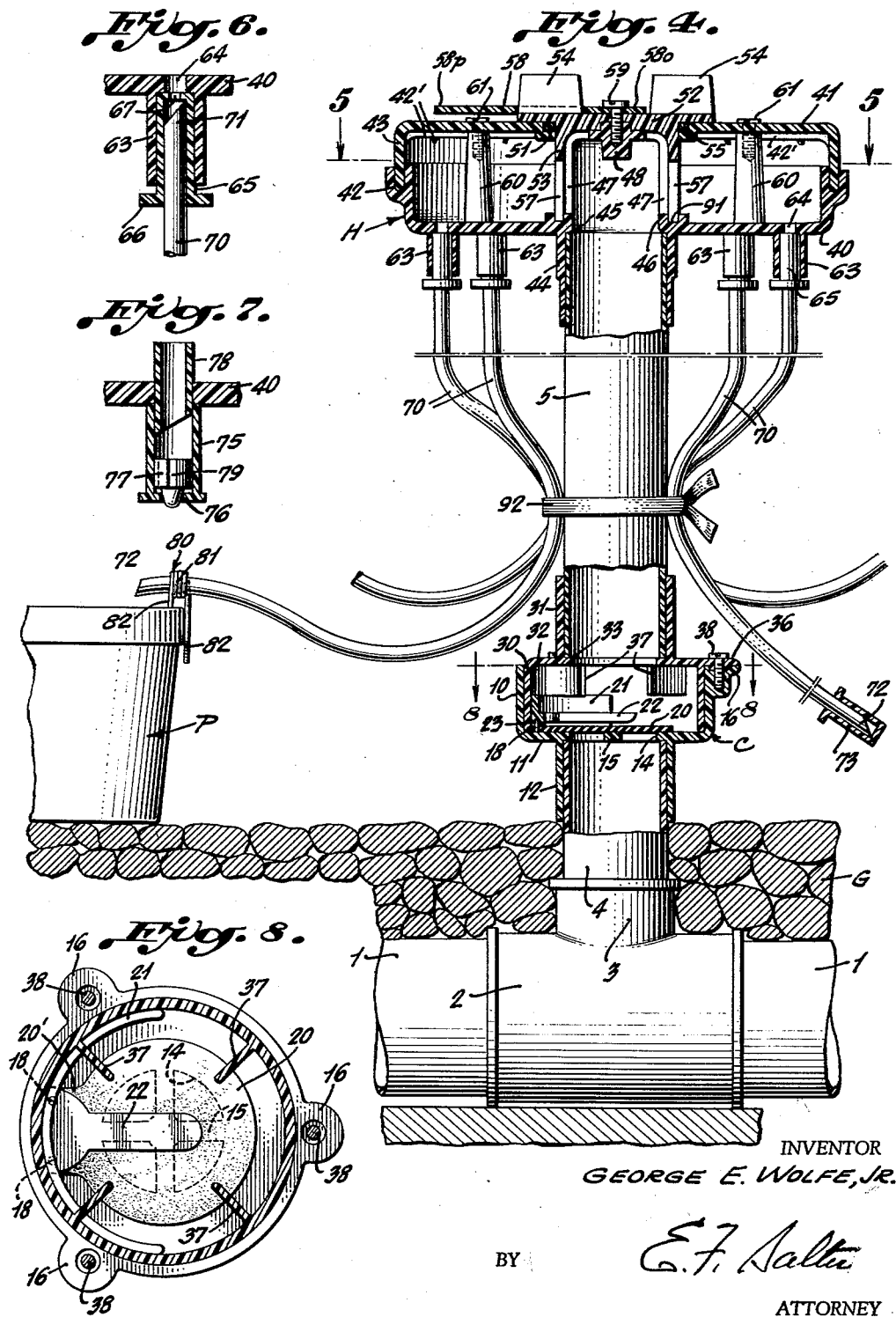

United States Patent Office 3,108,400
Patented Oct. 29, 1963

3,108,400
PLANT WATERING SYSTEM
George E. Wolfe, Jr., P.O. Box 330, Waco, Tex.
Filed Oct. 4, 1961, Ser. No. 142,855
6 Claims (Cl. 47—18)

This invention relates to a plant watering system and more particularly to a watering system for large numbers of potted plants which are grown in greenhouses or nurseries.

It is an object of the present invention to provide a watering system for greenhouses or nurseries which is economical to install as well as economical to maintain, and which is capable of watering hundreds of potted plants rapidly and reliably with accurately controllable amounts of water, and all this with minimum supervision and attention by nursery employees.

It is another object of the invention to provide a watering system which is rugged in construction, flexible in its design to accommodate varying needs and conditions encountered in water supply systems, and adapted for easy installation and attention by unskilled help.

The invention contemplates an extensive water distribution system composed essentially of components of plastic material, which are fabricated at low cost and readily assembled. These components may be set up in a manner to introduce an element of automation in the attendance of hundreds of potted plants which normally require careful attention and periodic watering in controlled amounts to maintain them in live and flourishing condition.

The system is adaptable to all types of installations for the handling of plant containers such as pots, cans, clay and plastic receptacles which may be disposed on ground beds, ground benches, raised benches of wood or concrete, tables or the like, and which may be disposed on the outside or in greenhouses, screen houses or plastic houses.

The watering system in accordance with the invention is capable of rapid installation, since the same may be executed by two men, without any special tools, in about thirty-five minutes per bench of approximately one hundred feet in length. No leveling, thread-cutting or welding operations are required. Once installed, the system makes possible the simultaneous watering of eight hundred potted plants in about ninety seconds, and the system lends itself to expansion by multiplying the number of benches to which the same may be applied so that the capacity of a nursery is limited only by its available area for setting up potted plants. The element of manual labor required for the attention of a large number of potted plants becomes a minor one since fifteen to twenty benches, each bench holding approximately eight hundred plants can be watered by the system in accordance with the invention in the same time as is now normally required for the watering of one bench supporting eight hundred plants. In one plant layout, the invention makes possible the watering of nearly forty-five hundred plants on fourteen benches in twenty-one minutes.

It is another object of the invention to reduce the amount of attention required of the employees of a nursery in the watering of plants in order that they may be free for other chores or duties, thereby substantially reducing the labor costs in a nursery and the ultimate cost of the potted plants to the consumer.

Other objects and purposes will appear from the detailed description of the invention following hereinafter, taken in conjunction with the accompanying drawings, wherein FIG. 1 is a perspective view of a raised bench embodying the plant watering system in accordance with the invention;

FIG. 2 is a longitudinal sectional view of the bench shown in FIG. 1;

FIG. 3 is a plan view of one of the water headers set for maximum water flow therefrom;

FIG. 4 is a vertical sectional view with certain parts in elevation of one of the water distributing assemblies for the plurality of plant receptacles positioned nearby;

FIG. 5 is a horizontal section view along line 5—5 of FIG. 4;

FIG. 6 is a vertical sectional view along line 6—6 of FIG. 5 showing a connection from the water header or distributor to the inlet end of one of the water feeding tubes;

FIG. 7 is a vertical sectional view along line 7—7 of FIG. 5 illustrating the vacuum breaking device in the water header;

FIG. 8 is a horizontal sectional view along line 8—8 of FIG. 4, illustrating the check valve construction in each water distributing assembly; and FIG. 9 is a perspective view of a spring clamp which is threaded onto each water feeding tube adjacent the outlet end for attachment to the plant receptacle.

In the drawings is shown the installation of the water distributing system in accordance with the invention applied to a raised bench which may be housed in a greenhouse. This bench B may be supported on frame F and is adapted to contain a bed of gravel G for supporting hundreds of potted plants P along the length of the bench, which may range in size from fifty feet to one hundred twenty feet depending upon the plan of the building, and which generally approximates one hundred feet in length. The pots may be of different sizes, such as five, six, seven and eight inches, and a plurality of different sizes, designated in the drawings as P1, P2 and P3, may be grouped in proximity to different water distributors or headers H along the length of the bench.

The main water conduit extends longitudinally of the bench and consists of a plurality of conduit sections 1 alternating with T connections 2 which run from the inlet end I of the water system to the terminal end 7. The main water line formed by the several conduit sections is preferably embedded below the top surface of the gravel bed. The conduit sections 1, as well as the T connections 2, are formed of plastic material and the co-axial opposite ends of the T connections receive the ends of the conduit sections in tight frictional engagement. The medial neck portion 3 of each T connection receives a short riser or nipple pipe 4 onto which is seated a water distributing assembly consisting of a check valve casing C, a main riser pipe 5 and a water header H, all of which parts are formed of plastic material and which are shipped to the point of installation in completely assembled condition.

Each water header is capable of adjustment to control the amount of water distributed therefrom to as many as thirty-two water feeder tubes 70 which are connected to the base thereof. As stated above, the size of the pots on the bench may vary, but those grouped around the separate headers are of the same size so that the same amount of water is received in each pot of the same size. A control or modulating valve forms part of each header and the amount of water discharged to each plant may be checked by connecting one of the feeder tubes to a measuring bottle M (FIG. 1), to measure accurately the amount of water received by each of the plant receptacles.

The check valve assembly C, which is positioned on the short riser pipe 4, is formed of an interfitting base and cover, which are interconnected by means of angularly displaced apertured tabs 36 on the cover overlying bored integral lugs 16 on the base, with self-threading fastening screws 38 extending into the latter.

The base and cover may be formed of molded plastic material. The base consists of a cylindrical lateral wall 10 merging into a base portion 11 from which projects the downward cylindrical extension 12, the internal wall of which frictionally engages the upper portion of the short riser pipe 4. The base 11 is formed with a central circular opening 14 which is bridged by diametral crossarms 15 to impart strength to the base and to limit downward movement of the flexible flap valve 20. This flap valve 20, of rubber sheeting, overlies the opening 14 and is provided with a radial projection 20′ having openings in the latter which are adapted to seat upon pins 18 projecting upwardly from the base 11 and molded integrally therewith. A retainer for the flap valve consists of an arcuate lateral wall 21 which is provided with openings 23 in the lower edge thereof for the purpose of receiving the pins 18, and the bottom edge of the arcuate wall 21 is notched at this portion in order to accommodate the radial portion 20′ of the flap valve. A restraining arm 22 extends radially from the arcuate lateral wall 21 in overlying relation to the flap valve 20 to permit a limited amount of movement of the latter in an upward direction in response to the water pressure in the system.

The arcuate lateral wall 21 is maintained in seated position on the pins 18 and the base 11 by means of radial wings 37 molded integrally with the cylindrical and top walls 30 and 32, respectively, of the cover of the check valve casing. A cylindrical extension 31 extends from the cover portion 32 having a central opening therein bounded by an internal shoulder 33 which is adapted to seat the lower end of the main riser pipe, which is frictionally engaged with the internal wall of the cylindrical extension 31.

The main riser pipe 5, which may be of a length of ten inches to twelve inches, supports the water header H which is likewise composed of a base 40 and cover 41. The base 40 is provided with a downwardly extending central cylindrical portion 44 and an inwardly offset upwardly extending central cylindrical post 46 which terminates in a crown or top portion 48. The cylindrical portion 44 snugly receives the upper end of the riser pipe 5 which seats against the shoulder 45 defined by the inward offsetting of the post 46. The cylindrical post is provided with diametral ports or openings 47 which may be of generally rectangular outline and which extend beyond the lateral wall of the post to the top wall thereof, as shown in FIG. 4. The cover 41 of the water header is annular in form and is provided with a circular opening at the center thereof bounded by a depressed shoulder 51. The cover is also provided, at the under side thereof, with circumferentially spaced, radial reinforcing ribs 42′ which extend from the circular opening in the cover to its outer peripheral wall 43. The outer peripheral wall 43 of the cover 41 extends downwardly into a groove 42 formed in the outer peripheral wall of the base 40. Three upstanding posts 60, molded integrally with the base, extend upwardly therefrom at equidistantly displaced points and are apertured at the upper ends thereof for the purpose of receiving self-threading screws 61 extending through openings in the top of the cover 41 for the purpose of interconnecting the cover and base.

A modulating valve for controlling the amount of water admitted into the header is provided by a sleeve valve surrounding the central post 46 of the base. This valve is formed by a circular plate 52 overlying the central opening in the cover 41 from which projects downwardly the cylindrical sleeve 53. The latter is provided with diametrally opposed ports 57 therein which may be rotated into coinciding relationship with ports 47 in the central post 46, as shown in FIG. 5, or in obturating relationship thereto by turning the sleeve valve 90°.

An index finger 58, with a pointed end 58p, has a longitudinal opening 58′ at an intermediate portion thereof which is adapted to be seated over one of the wings 54 extending upwardly from the circular plate 52. The finger is fastened to the cover 41 by means of bolt 59 extending through an aperture in the end 58o, remote from the pointed end 58p, and through circular plate 52 into the central portion 48 of the post 46.

Indicia 90 is provided on the top wall of the cover for cooperation with pointer 58 to indicate the degree of registry between the ports 47 and 57 to control the amount of water passing to the header.

The lower edge of the cylindrical sleeve 53 is adapted to be received in groove 91 molded within the base 40 of the water header immediately beyond the central post 46. An annular gasket 55, of rubber or similar flexible material, is seated on the depressed shoulder 51 of the cover adjacent to the boundary of the circular opening in the cover to preclude or minimize water leakage from the header at the top thereof.

The base of the header is molded with a plurality of nipples 63 extending downwardly therefrom and these may be arranged in a pair of concentric circles. In the illustrated embodiment of the invention, thirty-two such nipples are provided, each communicating with openings 64 in the base, in order to discharge the water from the header through the feeder tubes 70 into as many as thirty-two plant receptacles positioned in proximity to the water header.

Adapter plugs 65, each provided with an external flange 66 at one end thereof and a restricted passage 67 at the opposite end thereof, are adapted to be inserted into the nipples 63 and are frictionally retained therein. The inlet ends 71 of the water distributing tubes 70 are inserted into the open ends of the plugs and the outlet ends 72 are led to the several plant containers P for the discharge of the water therefrom. Fasteners 80, each formed of a length of spring wire which is looped into an eye 81 with arms 82 diverging therefrom are disposed on the water distributing pipes 70 adjacent to the outlet ends thereof by threading the eyes 81 onto the tubes. The arms 82 are sprung apart to embrace the edge of the plant receptacle P, as shown in FIG. 4, so that the water discharging by gravity from the bottom of the header is discharged uniformly into each one of the plant receptacles with a flow trajectory of approximately two to two and one-half inches in length.

The flexible feeders 70, which may be formed of polyethylene tubing, are maintained in orderly array in proximity to the water distributing station by tying the several tubes 70 to the riser pipe 5 by means of a tie 92. When some of the plants are moved away, making less than thirty-two water tubes necessary, such tubes may be disabled by applying closure caps 73 to the open ends 72 of the discharge tubes. These closure plugs may be similar to the plugs 65 in construction, but, of course, no outlet opening is provided therein. Preferably these closure plugs 73 are molded from a differently colored plastic than that used for the molding of the adapter plugs 65.

In view of the rough conditions which may be encountered in a nursery in connection with the erection of the benches or tables for supporting the plants, it is highly possible that the main water conduit is not level and that a fall between one end and the other may amount to as much as four to eight inches. In order to prevent any siphoning action between the water distribution system and the individual headers after the water is discharged from the latter into the feeder tubes 70, an anti-siphoning valve or vacuum breaking valve is affixed to the header. This valve is shown in FIGS. 5 and 7 and consists of a fitting 75 which may be frictionally affixed to a short piece of tubing 78 extending below the bottom 40 of the header which is provided with a seat 76 and a movable valve 77 having a grooved lateral wall 79 and a conical tip for seating against seat 76. Normally, the water pressure in the system, or the water in the header, serves to force the valve 77 against its seat 76, as shown in FIG. 7. However, the passage of water from the water header and the closure of the check valve 20 in the valve casing C results in a lower pressure in the header, which is overcome by atmospheric pressure acting on the bottom of the valve 77 to admit air into the header through passages 79 in the valve which breaks any subatmospheric condition in the header.

The restricted opening 67 adjacent to the inlet end of each water feeder tube 70, enables a smooth flow of water to each plant receptacle without gurgling or the setting up of undesirable pressure conditions in the tube. The provision of adapter plugs 65 simplifies the cleaning of the tube passages and particularly the interior of the water header, since openings 64 of larger cross-section preclude any objectionable clogging of these openings in the normal operation of the system. Thus, the provision of reduced opening 67 in the plug 65 results in a system which may be maintained more easily in good working operation than one in which the openings of reduced cross-section are formed directly in the bottom 40 of the header.

The difference in the diameter of the orifice and the diameter of the feeder tubes is very important. The smaller orifice controlling the admission of water to the inlet of each tube assures a uniform volume of water in the receptacles, irrespective of their distance from the header. The use of a smaller orifice and a tube of larger diameter practically eliminates friction, so that an even distribution of water is attained. In the present arrangement, plant receptacles four feet away receive substantially the same quantity of water as those two feet away, in the same length of time.

In view of the fact that the several components of the water distributing system are devoid of any threading, the assembly of the water conduit sections, T connections, the riser pipes and the check valve casing and header, present a simple operating procedure which is executed after the first connection of the plastic pipe 1 to a conventional water pipe, which is fitted with a globe valve V (FIG. 2). The supply line also includes a main cut-off valve V'. After the gradual admission of water by the opening of the main valve V' of the system, to wash out the gravel and other foreign particles from the system, the distribution system is controlled by the globe valve V which admits the water thereto gradually by the passage of the water through the several T connections, the check valves and the headers. A safety valve S may be provided at the end of the water conduit opposite the admission line, which end is plugged by terminal coupling 7. This safety valve is of substantially the same construction as the check valve C, but is in inverted position from that shown in FIG. 4. It is provided with a protuberance at the center of the cross-arms 15 in order to maintain the flap valve spaced from its seat on a horizontal plane. This safety valve should be placed at the lowest part of the water line, which may not always be at the end thereof.

When the water is shut off at the valve V, the check valve 20 at each one of the T connections is closed, and the water in each of the headers recedes to the level of the bottom thereof as the same flows therefrom by gravity to the several plant receptacles, leaving a standing head of water in the riser pipes 5 until the next time water pressure is imposed on the system so that the headers immediately start filling up in varying amounts for distribution to the plant receptacles. Undesirable flow between headers and the conduit system is prevented by the vacuum breaking device disposed in each header, which comes into action after the check valves 20 stop the flow of water from the main line.

Whenever the plant containers on a bench are depleted to the extent that blocking off the water distribution tubes by plug 73 is too time-consuming, the complete header may be cut out of action by adjusting the modulating valve to its Off position. Furthermore, the entire water distributing assembly may be incapacitated by removing the check valve casing and header from the tube of the riser pipe 4 and capping the same with a closure plug.

This application is a continuation-in-part of my applications Serial No. 12,793, filed March 4, 1960, and Serial No. 66,622, filed November 1, 1960, both now abandoned.

While I have described my invention as embodied in a specific form and as operating in a specific manner for the purpose of illustration, it should be understood that I do not limit my invention thereto, since various modifications will suggest themselves to those skilled in the art without departing from the spirit of my invention, the scope of which is set forth in the annexed claims.

I claim:

1. In a potted plant watering system, an elongated bench supporting a plurality of plant receptacles thereon, a substantially rectilinear main water conduit extending longitudinally of the bench and composed of a plurality of conduit sections alternating with T-connections, each having the opposite ends thereof frictionally engaging the ends of adjacent conduit sections and the medial neck portion thereof facing upwardly, a short riser pipe frictionally engaging said neck portion, a check valve casing seated on said short riser pipe and containing a check valve permitting only uni-directional flow of water from said main water conduit, a main riser pipe extending from said casing, a water header frictionally seated on the upper end of said main riser pipe, an adjustable valve in said header and independent of said main water conduit for controlling the quantity of water fed into said header from said main riser pipe, said header having a plurality of openings in the bottom thereof for the passage of the water therefrom, a plurality of flexible feeder tubes having inlet ends detachably connected to the bottom of said header and the openings therein and outlet ends adapted to be positioned in the plant receptacles on the bench, said check valve casing being formed of an interfitting base and cover with centrally disposed cylindrical extensions embracing said riser pipes, a substantially circular flexible flap valve having a radial projection with openings therein loosely mounted on pins extending upwardly from said base, a retainer for said valve having an arcuate lateral wall spaced from the cylindrical lateral wall of said base with a notched bottom edge having recesses thereat for receiving said pins to permit limited movement of said radial portion of said flap valve, and an arm extending radially from said arcuate lateral wall above said edge to permit said circular flap valve to move upwardly a limited amount in response to water pressure in the system.

2. An apparatus as set forth in claim 1 wherein the check valve casing is formed of interfitting cylindrical base and cover bodies with the body of the cover nesting inwardly of the base and between the lateral wall thereof and the arcuate wall of said retainer, a plurality of angularly displaced lugs on the outer periphery of the base adjacent to the upper edge thereof, a plurality of corresponding tabs extending outwardly from the cylindrical body of the cover, fasteners for interengaging said lugs and tabs, and a plurality of vertical wings extending inwardly from the cylindrical wall of said cover body with the lower edges thereof seated against the top edge of said arcuate lateral wall of said retainer.

3. In a potted plant watering system, an elongated bench supporting a plurality of plant receptacles thereon, a substantially rectilinear main water conduit extending longitudinally of the bench and composed of a plurality of conduit sections alternating with T-connections, each having the opposite ends thereof frictionally engaging the ends of adjacent conduit sections and the medial neck portion thereof facing upwardly, a short riser pipe frictionally engaging said neck portion, a check valve casing seated on said short riser pipe and containing a check valve permitting only uni-directional flow of water from said main water conduit, a main riser pipe extending from said casing, a water header frictionally seated on the upper end of said main riser pipe, an adjustable valve in said header and independent of said main water conduit for controlling the quantity of water fed into said header from said main riser pipe, said header having a plurality of openings in the bottom thereof for the passage of the water therefrom, a plurality of flexible feeder tubes having inlet ends detachably connected to the bottom of said header and the openings therein and outlet ends adapted to be positioned in the plant receptacles on the bench, said water header being formed of an annular pan-like base having a ported cylindrical post at the center thereof and an outer lateral wall fitted with a circular groove along the upper edge of said wall, an annular cover having a circular opening at the center thereof and lateral wall extending downwardly into said groove, a sleeve valve comprising a circular plate overlying said circular opening and a ported cylinder extending downwardly from said plate and surrounding said cylindrical post to constitute the adjustable valve in said header, and means for connecting said circular plate to the upper end of said cylindrical post to permit relative rotary movement therebetween.

4. An apparatus as set forth in claim 3 wherein the ported cylindrical post and the ported cylinder of the sleeve valve are provided with diametrally opposed port openings of generally rectangular outline.

5. An apparatus as set forth in claim 3 wherein the base and the cover are provided with grooves adjacent to the center thereof, an annular gasket in the groove of the cover for seating the circular plate and the upper end of the ported cylinder of the sleeve valve, and the groove on the base adapted to seat the lower edge of said ported cylinder during the rotary movements thereof relative to the cylindrical post adjacent thereto.

6. An apparatus as set forth in claim 3 wherein the ported cylindrical post and the ported cylinder of the sleeve valve are provided with diametrally opposed port openings of generally rectangular outline, and annular grooves in the base and cover adjacent to the center thereof, an annular gasket in the groove of the cover for seating the circular plate and the upper end of the ported cylinder of the sleeve valve, and the groove on the base adapted to seat the lower edge of said ported cylinder during the rotary movements thereof relative to the cylindrical post adjacent thereto, an index finger affixed to said circular plate, and indicia on the cover adjacent to the periphery thereof for cooperation with the index finger to indicate the degree of registration between the port openings in said cylindrical post and surrounding sleeve valve.

References Cited in the file of this patent

UNITED STATES PATENTS

| 606,842 | Miller | July 5, 1898 |
| 1,010,819 | Thompson | Dec. 5, 1911 |
| 1,042,501 | Thompson | Oct. 29, 1912 |
| 1,439,031 | Sterrick | Dec. 19, 1922 |
| 2,102,848 | Kocour | Dec. 21, 1937 |
| 2,157,554 | McFarlin | May 9, 1939 |
| 3,046,698 | Breen et al. | July 3, 1962 |

FOREIGN PATENTS

| 720,949 | Great Britain | Dec. 29, 1954 |
| 903,148 | Germany | Feb. 1, 1954 |